United States Patent Office 3,111,639
Patented Nov. 19, 1963

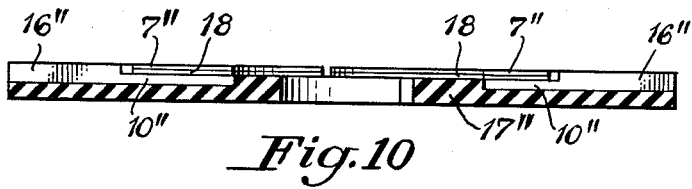
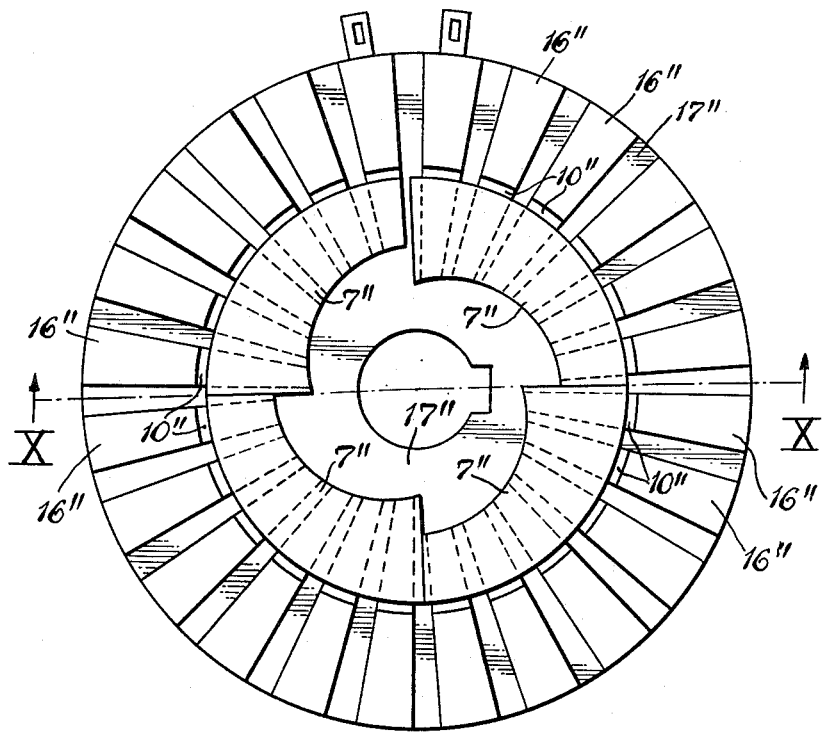

3,111,639
NON-LINEAR CONTROL POTENTIOMETER PROVIDED WITH A SEMI-CONDUCTIVE RESISTANCE LAYER
Martin Ploke, Kiel, Germany, assignor to Zeiss Ikon Aktiengesellschaft, Stuttgart, Germany
Filed Sept. 20, 1961, Ser. No. 139,525
Claims priority, application Germany Sept. 27, 1960
15 Claims. (Cl. 338—140)

This invention relates to improvements in control potentiometers which may be manufactured at relatively low cost and still possess a high degree of accuracy and reliability in operation. Potentiometers of this type are particularly well suited for controlling the photo current of photoelectric exposure meters in photographic cameras provided with automatic exposure meters. In cameras provided with such an exposure meter it is frequently desired to vary the photo current in predetermined discrete steps which correspond each to one gradation of the diaphragm scale. In order to consider properly the photocell characteristics, it is necessary to provide a bias resistance variable from step to step in accordance with an empirical law. Particularly in bridge circuits employing photo resistances it is required that for this purpose a control potentiometer be used which has a control characteristic following an exponential function.

It has been proposed heretofore to employ for similar purposes among other devices a wire wound potentiometer with a section-like linear winding. However, such wire wound potentiometers have not only a relatively large size, but they have in addition thereto the disadvantage that the required empirical characteristic of the resistance can be produced only in a rough approximation. High resistance values can be obtained only with extremely thin wires and this frequently gives rise to troubles. Also proposed heretofore have been potentiometers which are provided with a sprayed resistance layer whose specific resistance is made variable, for instance, by a non-uniform movement of the potentiometer base relatively to the spray gun which produces the resistance layer. In potentiometers of this type the mass production of the resistances is very difficult and one is forced to permit relatively large tolerances in the accuracy of the resistances. In addition, the connection between the semi-conductive layer and the base of the potentiometer base is frequently the cause of a number of operative difficulties.

It is an object of the present invention to eliminate the aforementioned difficulties by producing the resistance of the potentiometer of individual sections of resistance material whereby each such section has a different total resistance while, however, within each section the specific resistance value remains constant. Furthermore, the regulating characteristic which permits the use of a substantially uniform gradation of the scale is obtained by a variable width of the resistance layer within each individual section of the same.

In accordance with the invention this construction of the control potentiometer improves substantially the mass production of the resistances. For the production of a trouble free contact between the movable contact arm and the semi-conductive resistance layer the latter is arranged upon a fine metallic screen which either directly or by means of a row of metallic contact members is engaged with the movable contact arm of the potentiometer.

The drawing illustrates by way of example a few preferred embodiments of the non-linear control potentiometer of the present invention.

In the drawings:

FIG. 9 is a top plan view of still another modified potentiometer, and

FIG. 10 is a sectional view along the line X—X of FIG. 10.

Figure 1:
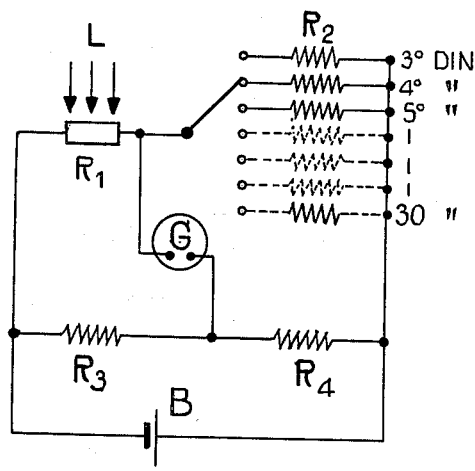
FIG. 1 illustrates a bridge circuit employing the control potentiometer of the invention.

Referring to FIG. 1, a bridge circuit is provided with a photo resistance $R_1$ which is energized by the light rays L coming for instance from the object to be photographed. The stepwise variable control potentiometer is designated with $R_2$, and $R_3$ and $R_4$ are fixed resistances. The measuring instrument of the bridge circuit consists of a galvanometer G and a battery B and is used to energize the bridge circuit. The individual resistance steps of the potentiometer $R_2$ are each associated with a specific film speed value to be considered when the camera is used for taking a picture. In the illustrated embodiment the range of these film speeds is from 2° to 30° DIN (German Industry Norm). Each three resistance steps correspond to 3° DIN of a diaphragm gradation so that the potentiometer covers a total of 9⅓ diaphragm gradations or a range of objective apertures (brightnesses) of $1:2^{9.33}=1:645$.

The variable resistance $R_2$ has to be so adjusted that no current will flow through the galvanometer G when the photo resistance $R_1$ receives from the object to be photographed an amount of light L which corresponds to the adjusted film speed value. The relation between $R_2$ and $R_1$ will then be as follows:

$$R_2 = \frac{R_4}{R_3} R_1$$

Since $R_3$ and $R_4$ have a fixed value, the value $R_2$ has to be made proportional to the possible resistance values $R_1$.

Figure 2:
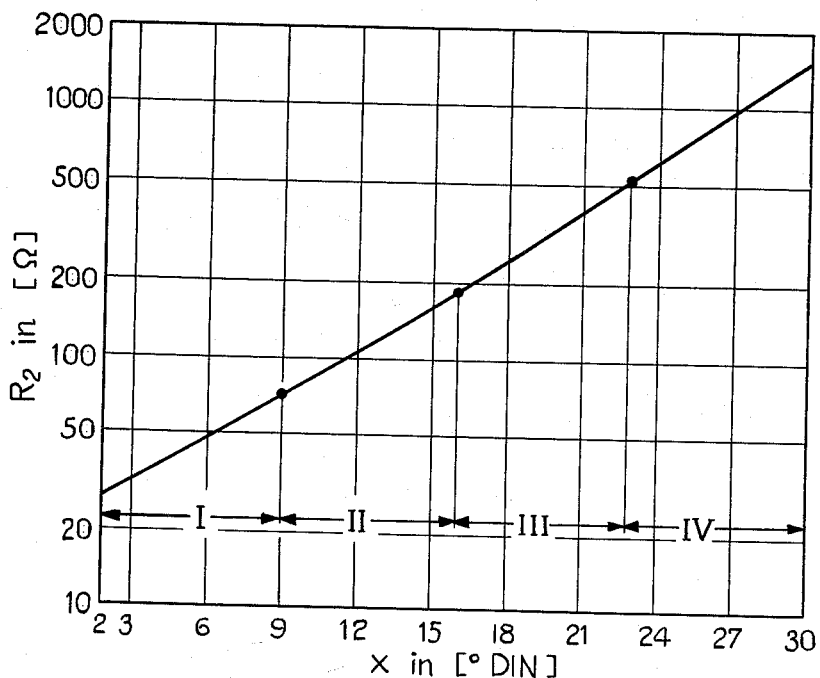
FIG. 2 illustrates the operating characteristic of the potentiometer.

FIG. 2 illustrates for a predetermined type of photo resistances the required association of the resistance values $R_2$ with respect to the film speed steps $x=3°$ to $x=30°$ DIN in a semi-logarithmic presentation. The problem is therefore to produce this characteristic with a reliable control potentiometer.

Figure 3:
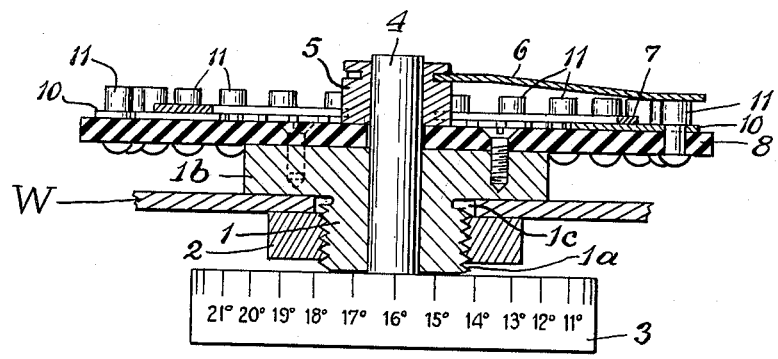
FIG. 3 is a sectional view of the potentiometer along the line III—III of FIG. 4.
Figure 4:
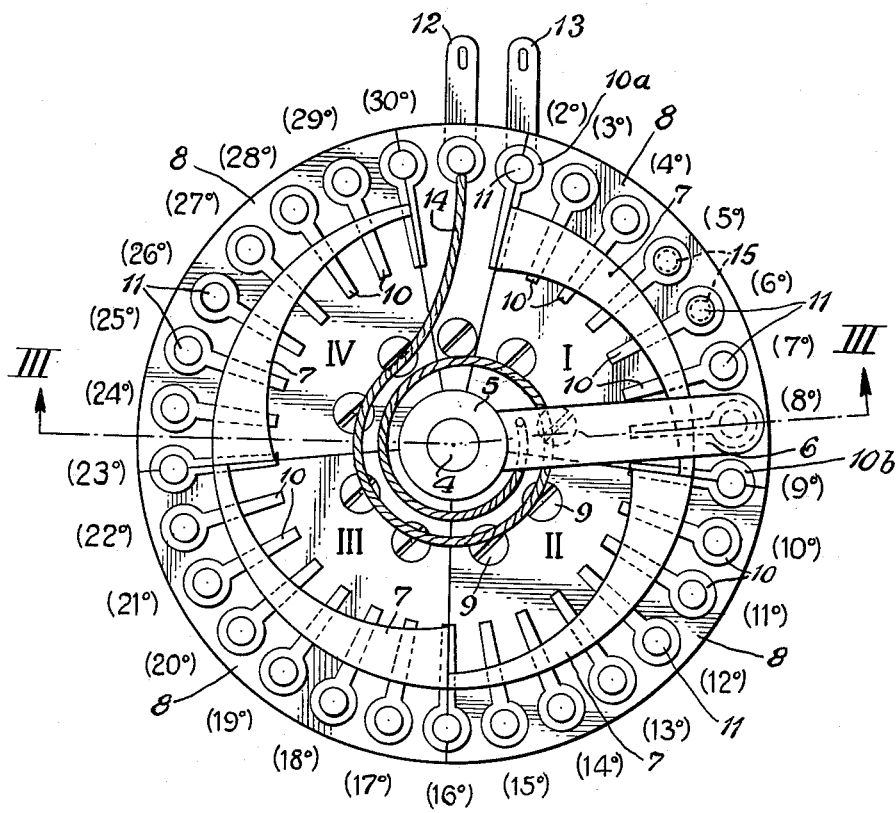
FIG. 4 is a top plan view of the potentiometer.

An example of a control potentiometer constructed in accordance with the present invention is illustrated in the FIGS. 3 and 4. The base of the potentiometer comprises a flanged sleeve 1 provided on one end with an exterior thread 1a for the attachment of a nut 2 which latter secures the flanged sleeve 1 in a casing wall W which for this purpose is provided with a suitable bore 1c. The wall W may be a portion of the exposure meter. FIG. 3 illustrates also the circular operating knob 3 which has on its circumference a film speed scale ranging from 2° to 30° DIN. This knob 3 is fixedly attached to a shaft 4 which extends through the bore of the flanged sleeve 1. The end of the shaft 4 which extends through the sleeve 1 and through the carrier of the resistance elements of the potentiometer has a collar 5 attached thereto from which a contact arm 6 extends substantially radially outwardly. The carrier of the semi-conductive resistance layer is formed, as particularly illustrated in FIG. 4, by four insulating sectors 8 designated I, II, III and IV. These sectors 8 are attached by means of screws 9 to the flange 1b of the sleeve 1. Each sector 8 has mounted thereon six complete conductive strips 10 and two split-conductive strips 10a and 10b (FIG. 5) at the radial edges of the sectors 8. All of these conductive strips 10 are covered by a semi-conductive resistance layer 7. Outside of this layer 7 the conductive strips 10, 10a and 10b are provided with a hole into which contact rivets 11 are inserted and secured as shown particularly in FIG. 3. The rivets 11 attached to the adjacent strips 10a and 10b provide a conductive connection between adjacent sectors 8. All top faces of the rivets 11 are adapted to come into engagement with the outer end of the rotatable contact arm 6. The number of these contact rivets 11 corresponds to the number of the film speed steps provided on the operating knob 3. In FIG. 4 these film speed values are indicated in brackets from 2° to 30° DIN. For the connection with the current supply are provided the terminal contacts 12 and 13 (FIG. 4). The terminal contact 12 is connected by means of a flexible conductor 14 with the contact arm 6, while the terminal contact 13 is directly connected with the conductive strip 10 of the sector I which corresponds to the film speed 2° DIN.

Figure 6:
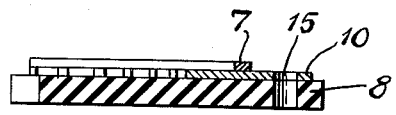
FIG. 6 is a sectional view of the partly finished sector of the potentiometer along the line VI—VI of FIG. 5 and illustrates in detail various parts.
Figure 5:
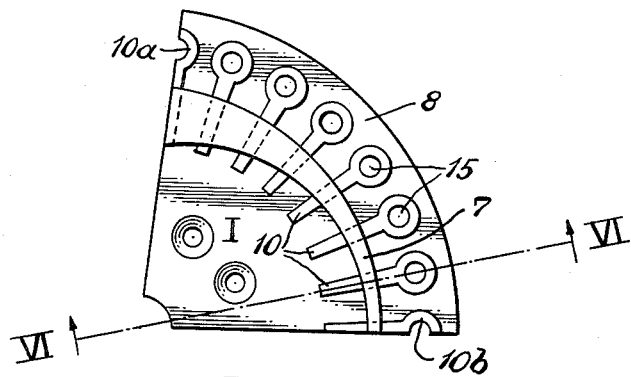
FIG. 5 is a top plan view of a partly finished sector of the potentiometer.

The FIGS. 5 and 6 show in detail one of the sectors I to IV when in a partly completed condition, namely without the contact rivet 11. These figures illustrate the semi-conductive resistance layer 7, the insulating sector-shaped base plate 8 and the conductive strips 10 which are arranged between the semi-conductive resistance layer 7 and the base plate 8. The conductive strips 10 are each provided with a hole 15 into which, as shown in FIG. 3, the contact rivets 11 are inserted. FIG. 5 also shows clearly the split- or half-size conductive strips 10a and 10b arranged along the radial edges of the sector 8 and which therefore permit a measurement of the total resistance of the resistance layer mounted on this particular sector 8.

One will appreciate that by the mentioned subdivision of the characteristic of the control potentiometer into four sectors each sector of the resistance layer will cover only one fourth of the total regulating circumference. While according to FIG. 2 the resistance must cover a control range from 28:1540 ohms=1:55, individual ranges of the resistances vary between 1:2.43 and 1:3.08. This is apparent from the following table which indicates for the four sectors I, II, III and IV the control circumference $R_{min}:R_{max}$ and shows the resistance value $R_{max}-R_{min}$ associated with each sector.

| Sector | $R_{min}:R_{max}$ | $R_{max}-R_{min}$ |
| --- | --- | --- |
| I | 28:68=1:2.43 | 40 |
| II | 68:181=1:2.66 | 113 |
| III | 181:500=1:2.76 | 319 |
| IV | 500:1,540=1:3.08 | 1,040 |

In accordance with the exposure meter of the present invention this resistance variation is obtained in this manner that the width of the resistance layer is changed in the same ratio. The decisive advance of the invention over the known potentiometers resides in this that each sector I to IV is provided with a resistance material having a uniform specific resistance throughout, or in other words, the semi-conductive material is of uniform consistency throughout the layer, which is mounted on each one of the sectors. It is, for instance, possible to provide each sector by means of a template with a resistance layer having a continuously variable width by spraying the resistance material onto the template, or the resistance material may be given the desired form by a printing process. Since the shape of the control curve is determined by the geometric form of the layer, this shape of the layer requires to be controlled and supervised during its production only in such a manner that between the conductive steps 10a and 10b, as shown in FIG. 5, the total resistance for each sector has the value as shown in the above table by the values $R_{max}-R_{min}$. The cost of production of such a sector of the control potentiometer does not exceed much the cost of production of fixed semi-conductive resistances. Also in respect of accuracy and ease of manufacture of the control curve it is easy to maintain the tolerances of 1 to 5% customary for semi-conductive resistances. All four sectors may be produced by the same method and there will be used always the same template or printing plate which corresponds to the resistance ratio $R_{min}:R_{max}$ of the respective sector. It is only necessary to watch that the specific resistance of the semi-conductive material used for each sector has a value as given in the above table. In addition, the potentiometer has to be provided with an initial resistance of 28 ohms which according to FIG. 2 corresponds to the lowest film speed of 2° DIN.

The conductive strips 10 which are arranged beneath the resistance layers 7 assure different voltage ratios and a reliable contact. The lengthwise split conductive strips 10a and 10b at the edge of the sectors serve two purposes: Firstly, they assure a reliable control of the total resistance $R_{max}-R_{min}$ of each sector, and secondly, they facilitate the current transmission between adjacent sectors. For instance, the connection between two sectors as shown in FIG. 4 may be performed by a single contact rivet 11 which connects the two adjacent strips 10a and 10b. The conductive strips 10, 10a and 10b may be produced by vaporization, spraying or printing of metallic layers. In addition, the known methods of production for making printed circuits can be employed so that the potentiometer may be produced economically by employing methods suitable for mass production.

The control potentiometer illustrated in the FIGS. 3, 4, 5 and 6 is provided with a number of film speed steps which is equal to the number of the employed conductive strips 10 and the contact rivets 11 therein. Of practical value is also a modified embodiment in which the number of the conductive strips is increased beyond the number of the film speed steps, for instance by a factor 2. In such an embodiment it is advisable to omit the contact rivets 11 and to provide at the point where the contact arm 6 engages the conductive strips solely reinforcements which are galvanically produced. These reinforcements are arranged outside of the resistance layer 7.

Figure 7:
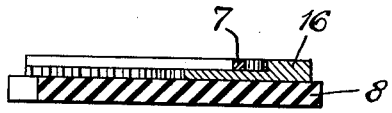
FIG. 7 is a sectional view of a modified construction of a sector of the potentiometer.
Figure 8:
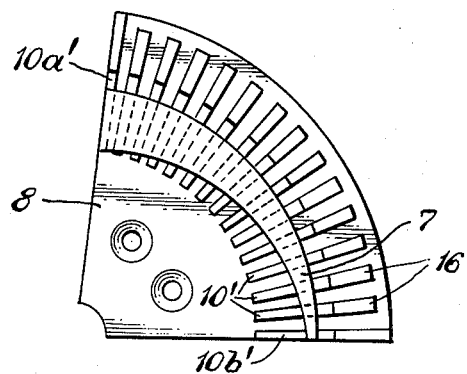
FIG. 8 is a top plan view of the sector shown in FIG. 7.

Such a modified sector of the potentiometer of the present invention is illustrated in the FIGS. 7 and 8. The insulating base 8 is provided with radially arranged conductive strips 10' which at their outermost ends are galvanically reinforced as shown at 16. The resistance layer is designated as formerly with 7 and lies inside of the reinforcements 16. In this particular embodiment the conductive connection between two adjacent sectors is produced by soldering the conductive strips 10a' and 10b' together. Owing to the omission of the contact rivets 11, there is obtained a certain savings in cost and in addition thereto, one has the possibility by changing the distance between the gradation lines of the film speed scale on the knob 3 when employing different photo elements or photo resistances the characteristics of which have a different pitch or angle. If the potentiometer, for instance, is to be used for photo resistances having a greater pitch, then the control curve has to be steeper than the one illustrated in FIG. 2. This is obtained by an increase of the distance between the scale lines on the operating knob. Obviously, by a compression of the scale divisions one may accommodate a control curve of photo elements and photo resistances which has a smaller pitch or steepness.

While in the above described embodiments of the invention the base 8 on which the spaced conductive strips and the semi-conductive resistances are mounted is subdivided in four sectors, it is also possible to simplify the potentiometer by employing a one-piece or common base as a carrier for all of the individual semi-conductive resistances, whereby this single base or carrier has preferably a plane mounting surface and serves as an insulating carrier.

A further simplification in the manufacture of the potentiometer of the invention is obtained when the semi-conductive resistances which are mounted on the base have a resistance value which is in excess of the desired or required value. It is then possible to produce the desired value of the resistances by subjecting the individual resistance elements to a grinding or polishing operation which is so performed that either the thickness and/or the width of the resistance layer is gradually reduced from one end portion to the other. A still further reinforcement of the control potentiometer of the invention is obtained by arranging a preferably low ohmic protective layer between the radially arranged conductive strips and the semi-conductive resistances. This low ohmic protective layer may for instance consist of carbon. A still higher quality improvement of the potentiometer of the invention is obtained by providing the resistance layer, after its completion, with a protective laquer coating.

Referring now to FIGS. 9 and 10, the individual conductive strips 10″ on the base 17″ are provided at their outer ends with a galvanic reinforcement 16″. Between the semi-conductive resistance layer 7″ and the conductive strips 10″ is arranged a low ohmic protective layer 18. After the conductive strips 10″, the protective layer 18 and the resistance layer 7″ have been mounted on the insulating base 17″, the resistance layer 7″ is subjected sector by sector to a grinding and polishing operation so that each sector of the resistance layer 7″ will have the desired resistance value. This grinding and polishing is performed in such a manner that the thickness of the resistance layer 7″ is gradually reduced from one end of a sector to the other. It is also possible to decrease gradually the width of the resistance layer 7″ sector by sector. It is advisable that during the grinding and polishing of one sector a protective cover is temporarily placed on the sectors which are not worked upon.

What I claim is:

1. In a non-linear control potentiometer, in particular for a variable photoelectric exposure meter for controlling the photo current and adapted to be employed with a camera having a graduated diaphragm scale, a base provided with a plurality of insulating sectors, a plurality of uniformly and circumferentially spaced conductive strips mounted on each one of said sectors, a contact arm mounted on a rotatable shaft adapted to move over said conductive strips and being in conductive connection with the latter, an operating knob provided with a substantially uniformly divided scale corresponding to the graduations of said diaphragm scale as well as the distance between said conductive strips, said knob being fixedly mounted on said shaft, and a plurality of semi-conductive resistances, one for each said sectors, placed above and in conductive relation with said uniformly spaced conductive strips, said semi-conductive resistances having each a different resistance value and being subdivided by said conductive strips into individual steps of uniform values which are different within the range of each of said sectors, each of said conductive strips being of progressively varying dimensions throughout its length.

2. In a control potentiometer according to claim 1, in which said semi-conductive resistances are arranged in series along a circular path and consists each of a portion of a circular ring having a uniform thickness, while the width of each resistance portion varies progressively and gradually from one end to the other, there being provided as many resistance portions as there are provided insulating sectors.

3. In a control potentiometer according to claim 1, in which said semi-conductive resistances consist of evaporated metallic substances deposited upon said insulating sectors.

4. In a control potentiometer according to claim 1, in which said semi-conductive resistances consist of metallic substances printed upon said insulating sectors.

5. In a control potentiometer according to claim 1, including solid conductor members fixedly attached to said conductive strips and having an end face which projects beyond the plane in which said semi-conductive resistances are arranged, said end faces being adapted to connect the conductive strip of one sector to that of an adjacent sector and to be engaged by said contact arm when said rotatable shaft is rotated.

6. In a control potentiometer according to claim 1, including solid conductor members fixedly attached to said conductive strips and having an end face which projects beyond the plane in which said semi-conductive resistances are arranged, said end faces being adapted to be engaged by said contact arm when said rotatable shaft is rotated, each conductive strip at the ends of each resistance being electrically connected with the adjacent conductive strips on the next adjacent insulating sectors by a single solid conductor member.

7. In a control potentiometer according to claim 1, in which said plurality of conductive strips is greater than the number of the scale lines provided on said operating knob.

8. In a non-linear control potentiometer, in particular for a camera having a diaphragm scale and a photoelectric exposure meter for controlling the photo current in said meter, an insulating base, a plurality of uniformly and circumferentially spaced conductive strips mounted on said insulating base to extend radially thereon, rotatable shaft means on said base, a contact arm on said shaft means adapted to move over said conductive strips and being in conductive connection with the latter, an operating knob on said shaft means provided with a substantially uniformly divided scale corresponding to the graduations on said diaphragm scale and the distance between said conductive strips, said operating knob being fixedly mounted on said shaft, and a plurality of semi-conductive resistances placed above and in conductive relation with said uniformly spaced conductive strips, said semi-conductive resistances each having a different resistance value and being subdivided by said conductive strips into individual steps of uniform values, each of said resistances being progressively increased in width from one end to the other.

9. A control potentiometer according to claim 8, in which said different resistance values are produced by grinding and polishing an oversized resistance to the required values.

10. A control potentiometer according to claim 8, in which said different resistance values are produced by gradually reducing the thickness of oversized semi-conductive resistances by grinding and polishing.

11. A control potentiometer according to claim 8, in which said different resistance values are produced by gradually reducing the width of oversized semi-conductive resistance layers by grinding and polishing.

12. A control potentiometer according to claim 8, including a low ohmic protective layer between said plurality of uniformly spaced conductive strips and said semi-conductive resistances.

13. A control potentiometer according to claim 8, including an insulating protective laquer coating on the exposed faces of said semi-conductive resistances.

14. In a rotary control potentiometer adapted to be used for controlling the photoelectric current in photoelectric exposure meters in cameras provided with an automatic exposure mechanism, comprising a base formed of a series of sector-shaped units of insulating material arranged to provide a disc, a semi-conductor resistance layer on each of said sector shaped elements formed of semi-conductive material of different specific resistance values which remain substantially constant, a series of circumferentially spaced radially arranged contact strips between said base sectors and said resistance layers, a shaft centrally mounted in said base, an arm on said shaft engageable with said contact strips in brushing contact therewith, a control knob for said shaft having graduations corresponding to the steps of the camera diaphragm scale and being spaced a distance corresponding to the spacing of said radial strips, said resistance layers being arcuately curved and of progressively decreasing dimensions from one end to the other in a clockwise direction.

15. Non-linear control potentiometer with a semi-conductor resistor layer, preferably used for controlling the photoelectric current in photoelectric exposure meters in cameras provided with an automatic exposure mechanism, characterized in this, that for the purpose of a good contact engagement the resistance layer is provided with a base layer consisting of a conductive strip, said resistance layer being composed of sectors of semi-conductive material of different specific resistance values which remains constant within each sector, and that for the purpose of employing a substantially uniform division of the scale the required control curve (characteristic) is formed solely by a varying width of the resistor layer within the individual sectors.

References Cited in the file of this patent

UNITED STATES PATENTS

| | | |
|---|---|---|
| 611,185 | Richardson et al. | Sept. 20, 1898 |
| 1,962,438 | Flanzer et al. | June 12, 1934 |
| 2,308,422 | McAllister | Jan. 12, 1943 |
| 2,632,831 | Pritikin et al. | Mar. 24, 1953 |
| 2,744,986 | Caldwell | May 8, 1956 |

FOREIGN PATENTS

| | | |
|---|---|---|
| 377,315 | Great Britain | July 28, 1932 |